(12) United States Patent
Athani et al.

(10) Patent No.: US 8,307,117 B2
(45) Date of Patent: Nov. 6, 2012

(54) SYSTEM AND METHOD FOR DATA EXCHANGE IN MULTIPROCESSOR COMPUTER SYSTEMS

(75) Inventors: Guruprasad Ramananda Athani, Bangalore (IN); A. r. Philip, Bangalore (IN); C. b. Shashi, Bangalore (IN)

(73) Assignee: Infosys Technologies Limited (IN)

( * ) Notice: Subject to any disclaimer, the term of this patent is extended or adjusted under 35 U.S.C. 154(b) by 0 days.

(21) Appl. No.: 13/156,422

(22) Filed: Jun. 9, 2011

(65) Prior Publication Data

US 2011/0238863 A1    Sep. 29, 2011

Related U.S. Application Data

(62) Division of application No. 12/319,561, filed on Jan. 8, 2009, now Pat. No. 8,032,654.

(30) Foreign Application Priority Data

Jan. 9, 2008    (IN) .................. 79/CHE/2008

(51) Int. Cl.
    *G06F 15/173*    (2006.01)

(52) U.S. Cl. ........ 709/238; 709/203; 709/240; 370/229; 370/420

(58) Field of Classification Search ............ 709/237, 709/240, 203, 238; 370/420
See application file for complete search history.

(56) References Cited

U.S. PATENT DOCUMENTS

| | | | | |
|---|---|---|---|---|
| 7,564,860 B2* | 7/2009 | Wybenga et al. | ............ | 370/420 |
| 7,784,055 B2* | 8/2010 | Srivastava | .................... | 718/105 |
| 2001/0051972 A1* | 12/2001 | Eydelman et al. | ............ | 709/200 |

OTHER PUBLICATIONS

Office Action from U.S. Appl. No. 12/319,561 mailed Dec. 27, 2010.

* cited by examiner

*Primary Examiner* — Kyung H Shin
(74) *Attorney, Agent, or Firm* — Lerner, David, Littenberg, Krumholz & Mentlik, LLP

(57) ABSTRACT

A system for data exchange in multiprocessor computer system is disclosed. The system includes at least one processing module adapted to communicate with at least one of a plurality of routing modules or a plurality of buffer modules or both and at least one communicating interfaces to facilitate data exchange in multiprocessor computer system.

1 Claim, 15 Drawing Sheets

| DPseln | | DPsel5 | DPsel3 | DPsel2 | DPsel1 | DPsel0 |
|---|---|---|---|---|---|---|

FIG. 19 – Path Selection word (PSW)

897

SYSTEM AND METHOD FOR DATA EXCHANGE IN MULTIPROCESSOR COMPUTER SYSTEMS

CROSS-REFERENCE TO RELATED APPLICATIONS

This application is a divisional of pending U.S. patent application Ser. No. 12/319,561, filed Jan. 8, 2009, the disclosure of which is incorporated by reference herein.

BACKGROUND OF THE INVENTION

The present invention relates to design of flexible data exchange mechanisms for multiprocessor based embedded applications. More specifically, the present invention provides architecture for implementing flexible data exchange between nodes of a heterogeneous multiprocessor system and improving the performance of embedded applications.

Embedded applications perform specialized tasks and are traditionally designed by taking into consideration various parameters such as speed, cost, efficiency and robustness. With an increase in the complexity of embedded applications, low power consumption and flexibility in design have also emerged as parameters which must be taken into consideration while designing an embedded application. The need of higher processing power at lower power consumption levels has driven designers to take multiple approaches in designing complex high performance embedded systems. One approach is a hybrid design where the application may be partly implemented on hardware and partly as one or more software modules running on a microprocessor. An alternate approach is to use multiple processing engines fabricated on a single chip allowing parallel execution of instructions. The processing engines used in this approach could be similar microprocessors, different kinds of microprocessors or special hardware modules. In any of these multiprocessor scenarios data exchange and synchronization mechanisms between the processing engines can greatly influence the performance of the overall system. The processing engines need to exchange raw data, results of processing, status, processing states etc., during run time. The term 'data exchange' is used broadly in all embodiments of the present technique to include all types of communication between the processing engines. Methods and systems employed for the data exchange in prior art are described below;

In one conventional method, any processor, when ready to send data, requests the arbitrator for gaining control of the common bus. Arbitrator, based on any chosen priority scheme, grants the control to the requesting processor. The requesting processor sends the data over the bus to the destination processor and then withdraws its request for the bus. This scheme is simple and allows any processor to communicate with any other processor on the bus; however, in this scheme the destination processor has to be ready to receive the data when the source processor is ready to send the data. Otherwise, one of the processors has to wait for the other. Besides, this scheme does not allow two or more processors to send data simultaneously to their respective destinations. The communication gets serialized and hence can delay the processing at both the source and destination processors. This is a serious limitation in systems where parallel execution is desired.

In another conventional method any processor can write data into the shared memory and the destination processor can consume the data at its convenience. This frees the source processor to take up the next job. This scheme requires some type of synchronization so that destination processor can know about the availability of new data in the memory. Also, parallel communication in this scheme is again limited by the number of ports the memory can support and the maximum possible memory access speed.

In yet another conventional method every processor is connected directly with every other processor through dedicated links. This scheme requires a lot of resources and can't be scaled up easily to incorporate more processors in the system although it does achieve fair amount of parallel execution. A variation of this approach is shown with reference to subsequent figures, where each processor is connected only to its neighboring processors and any communication to the non neighbor is through one of the neighboring processors. Paths to non-neighbors are determined using various routing algorithms. This scheme, though conceptually very efficient, involves, in its most generic form, implementation of highly generic and elaborate routing algorithms and is mostly used in large distributed networks where processing engines are general purpose computers physically located at different places. An improved version of such a scheme with optimum and efficient utilization of resources specifically suited for embedded multiprocessing applications is disclosed in this invention.

BRIEF SUMMARY OF THE INVENTION

In one embodiment of the present technique, a system for data exchange in multiprocessor computer system is disclosed. The system includes at least one processing module adapted to communicate with at least one of a plurality of routing modules or a plurality of buffer modules or both and at least one communicating interfaces to facilitate data exchange in multiprocessor computer system.

In another embodiment of the present technique, a method for buffering data in a multiprocessor computer system having at least one buffer module, at least one source module and at least one drain module is disclosed.

In yet another embodiment of the present technique, a method for routing data in a multiprocessor computer system using at least one router module is disclosed. The method includes receiving a request from one or more source ports and extracting destination port information from the module connected to the source port. The method further includes checking for availability of destination port and destination module and assigning a free channel based on a priority scheme to connect the source and destination ports and automatically transferring the data from source module to destination module.

BRIEF DESCRIPTION OF THE DRAWINGS

The present invention is described by way of embodiments illustrated in the accompanying drawings wherein:

FIG. 19 illustrates contents of Path Selection Word used in routing of data within the Routing Module, in one embodiment of the present technique;

DETAILED DESCRIPTION

The present invention provides a mechanism of exchanging data in an embedded multiprocessor environment. The system and method of sending, receiving, storing, forwarding and routing of data in such an environment is disclosed. In various embodiments of the present invention, design of data exchange buffer that can work in various modes of data exchange and design of routing module that can route data in packet and stream form are presented.

The disclosure is provided in order to enable a person having ordinary skill in the art to practice the invention. Exemplary embodiments herein are provided only for illustrative purposes and various modifications will be readily apparent to persons skilled in the art. The general principles defined may be applied to other embodiments and applications without departing from the spirit and scope of the invention. The terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
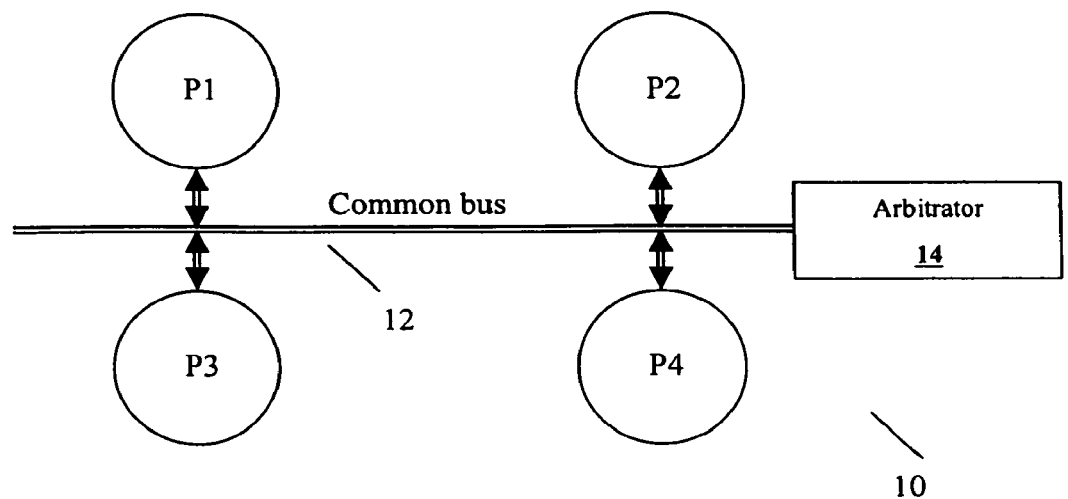
FIG. 1 illustrates a block diagram of a prior art multiprocessor system where processors are connected through a common bus.

FIG. 1 illustrates a block diagram of a prior art multiprocessor system 10 where processors (P1-P4) are connected through a common bus 12. In one embodiment, any processor, when ready to send data, requests the arbitrator 14 for gaining control of the common bus. Arbitrator, based on any chosen priority scheme, grants the control to the requesting processor. The requesting processor sends the data over the bus to the destination processor and then withdraws its request for the bus. This scheme is simple and allows any processor to communicate with any other processor on the bus; however, in this scheme the destination processor has to be ready to receive the data when the source processor is ready to send the data. Otherwise, one of the processors has to wait for the other. Besides, this scheme does not allow two or more processors to send data simultaneously to their respective destinations. The communication gets serialized and hence can delay the processing at both the source and destination processors. This is a serious limitation in systems where parallel execution is desired.

Figure 2:
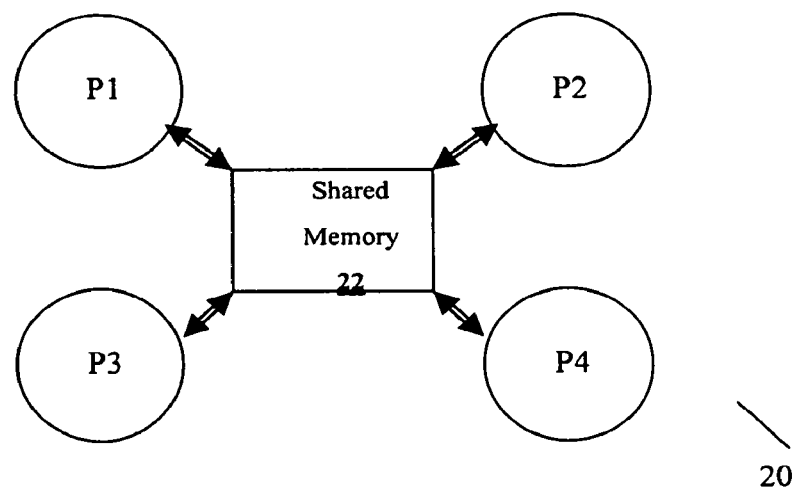
FIG. 2 illustrates a block diagram of a prior art multiprocessor system where processors are connected to a common shared memory.

FIG. 2 illustrates a block diagram of a prior art multiprocessor system 20 where processors (P1-P4) are connected to a common shared memory 22. In one embodiment any processor may write data into the shared memory and the destination processor can consume the data at its convenience. This frees the source processor to take up the next job. This scheme requires some type of synchronization so that destination processor can know about the availability of new data in the memory. Also, parallel communication in this scheme is again limited by the number of ports the memory can support and the maximum possible memory access speed.

Figure 3:
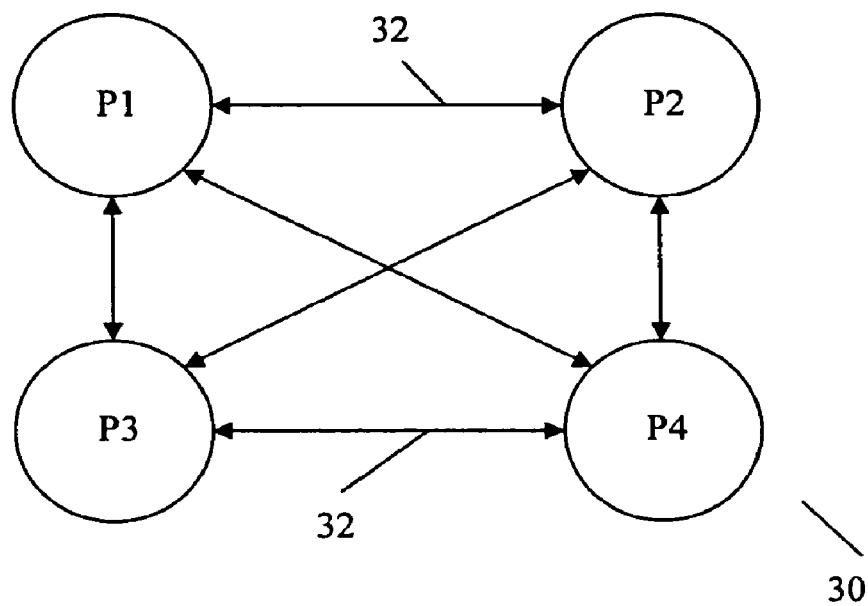
FIG. 3 illustrates a block diagram of a prior art multiprocessor system where processors are connected through one-to-one dedicated links.
Figure 4:
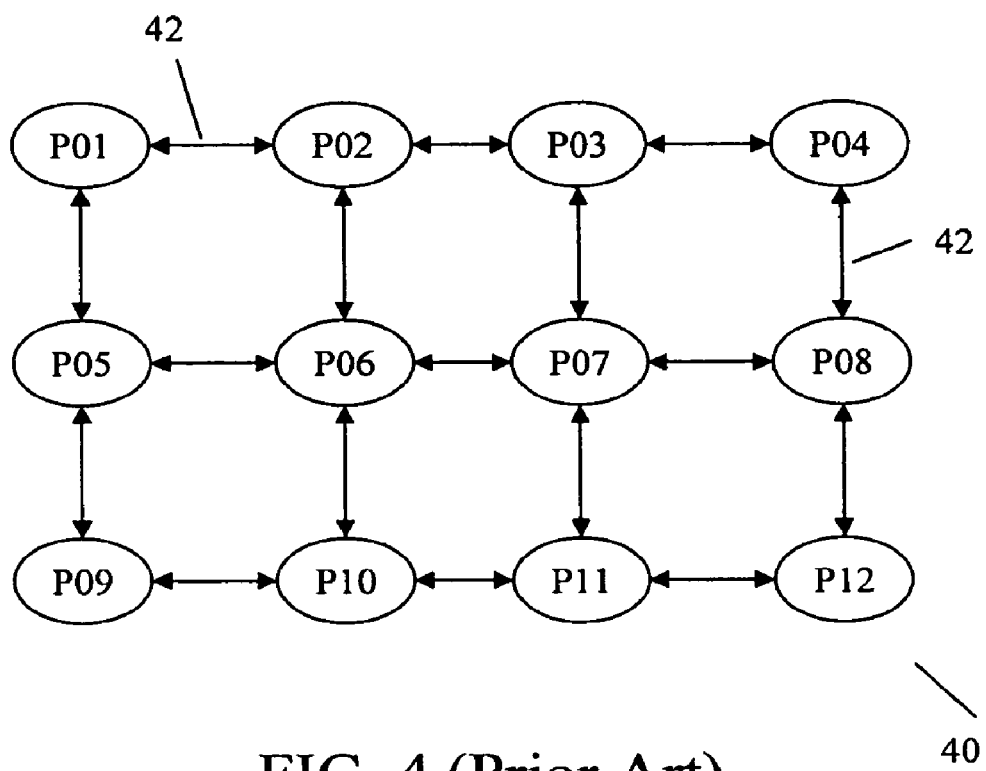
FIG. 4 illustrates a block diagram of a prior art multiprocessor system where processors are connected through dedicated links to neighboring processors.

FIG. 3 illustrates a block diagram of a prior art multiprocessor system 30 where processors (P1-P4) are connected through one-to-one dedicated links 32 wherein, every processor is connected directly with every other processor through dedicated links. This scheme requires a lot of resources and can't be scaled up easily to incorporate more processors in the system although it does achieve fair amount of parallel execution. A variation of this approach is shown in FIG. 4, where each processor is connected only to its neighboring processors and any communication to the non neighbor is through one of the neighboring processors. Paths to non-neighbors are determined using various routing algorithms. This scheme, though conceptually very efficient, involves, in its most generic form, implementation of highly generic and elaborate routing algorithms and is mostly used in large distributed networks where processing engines are general purpose computers physically located at different places. An improved version of such a scheme with optimum and efficient utilization of resources specifically suited for embedded multiprocessing applications is disclosed in this invention.

FIG. 4 illustrates a block diagram of a prior art multiprocessor system 40 where processing modules (P01-P12) are connected to neighboring modules through dedicated links 42. Communication between processing modules that are not connected through dedicated links could happen through processing modules lying between the source and destination modules. This scheme requires elaborate routing algorithm and also puts additional overhead on the processing modules as it needs to set aside resources to route data intended for other modules.

Figure 5:
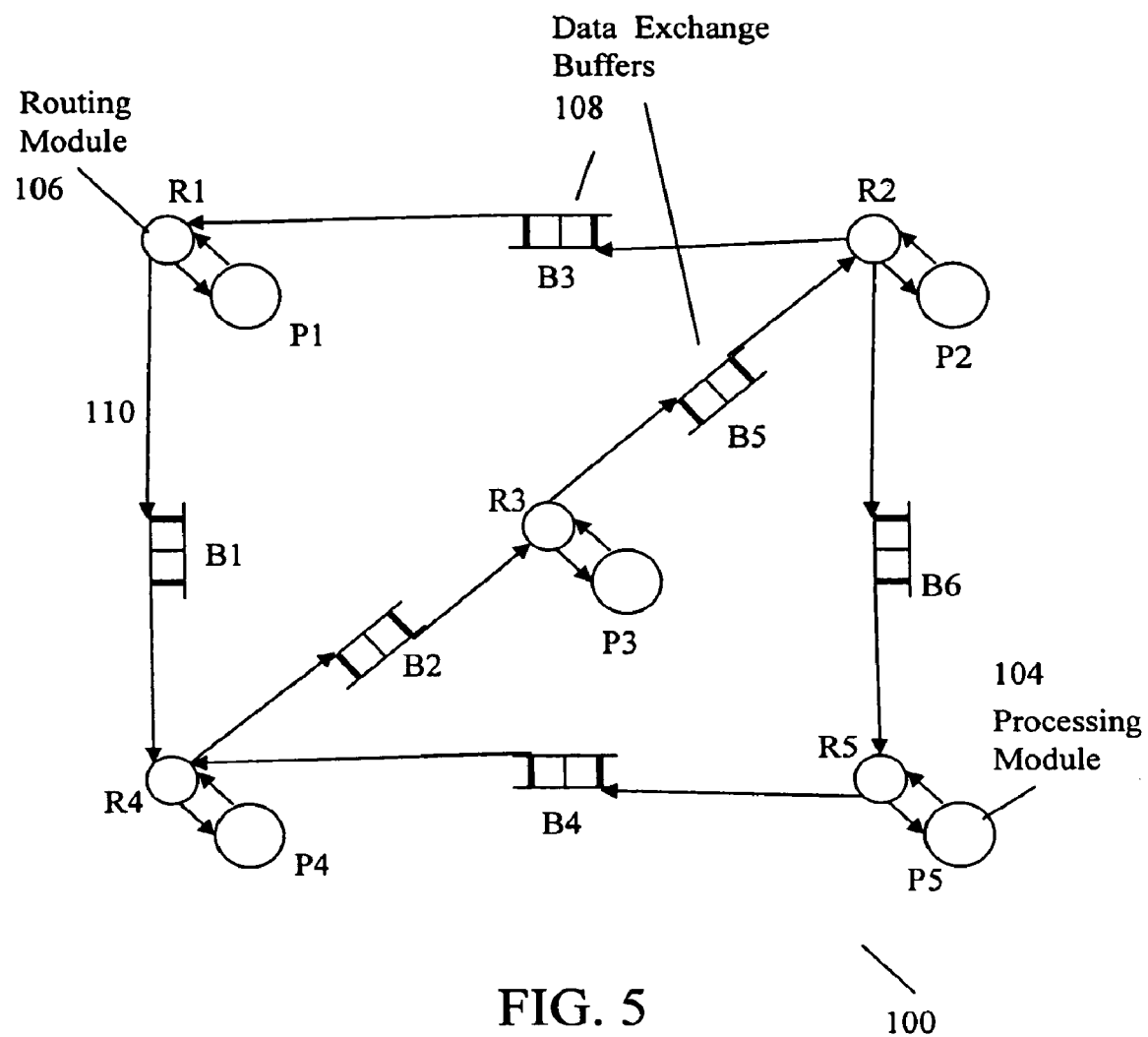
FIG. 5 and FIG. 6 illustrates exemplary block diagrams of heterogeneous multiprocessor systems with processing modules, routing modules, connections and data exchange buffers in accordance with one embodiment of the present invention.
Figure 6:
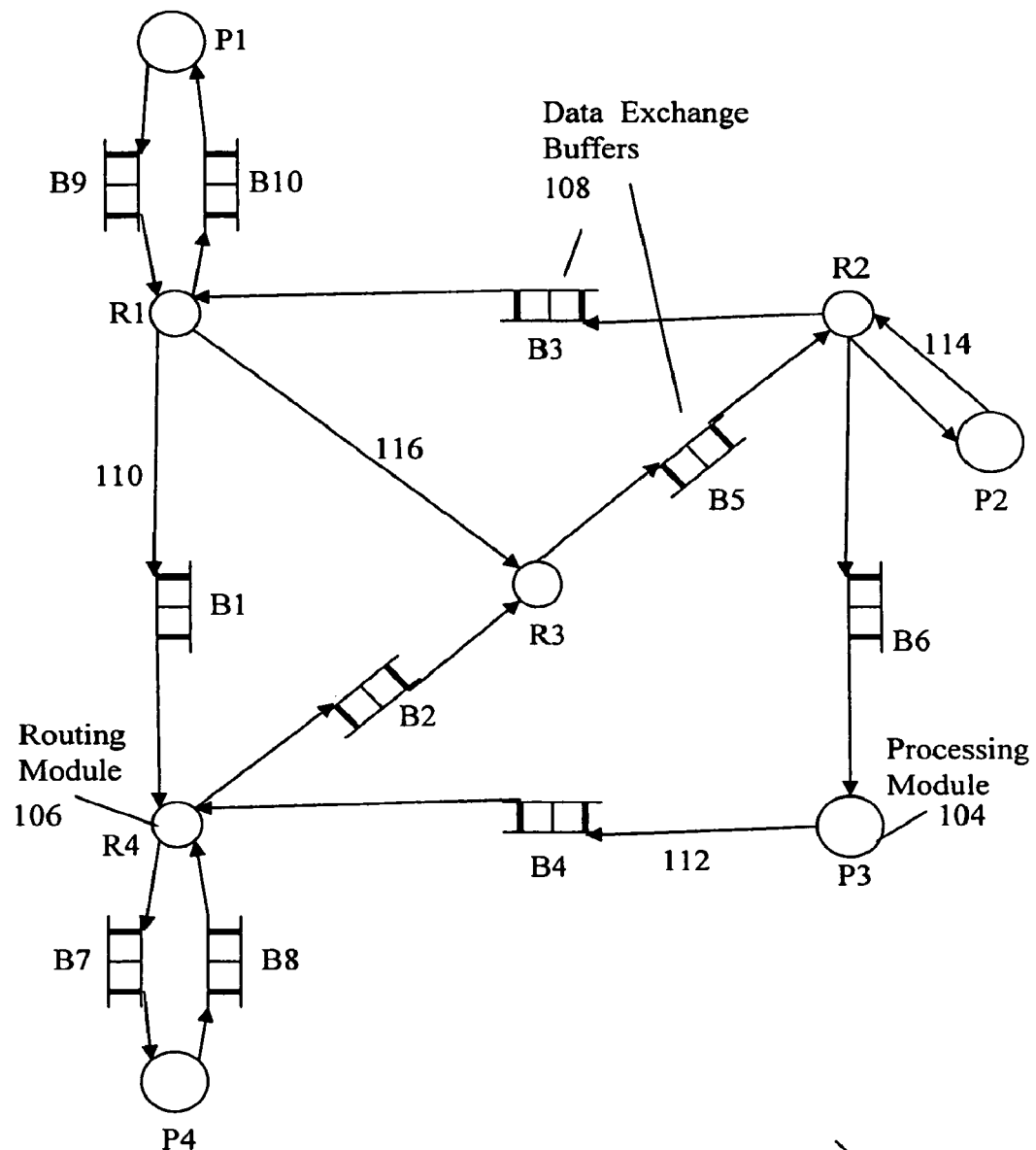

FIG. 5 and FIG. 6 depict block diagrams of exemplary embedded multiprocessor computer systems 100 (hereinafter multiprocessor system). Multiprocessor system (100 in FIG. 5 and 150 in FIG. 6) comprises two or more processing modules (PM) 104, one or more routing modules (RM) 106, one or more data exchange buffers (DEB) 108 and two or more connections 110.

Any processing module 104 may communicate with any other processing module through one or more data exchange buffers 108 and/or one or more routing modules 106. Processing modules 104 are the primary processing engines of the multiprocessor system. Routing module routes the data through the intended path to the intended destination node. Each PM 104 may operate at a different clock frequency and the DEB 108 is designed to handle different clock frequencies on either side of it. Processing modules 104 can be general purpose microprocessors, special purpose microprocessors or hardware modules designed for specific functions.

FIG. 5 illustrates one of the connection topologies in accordance with the present invention. In this topology every routing module RM 106 has one attached processing module PM 104. RM 106 routes the data from the attached PM 104 to any one of the intended output DEBs 108. Also, RM 106 routes the data from any of the input DEBs to the attached PM 104 or any of the intended output DEBs. In the example scenario shown in FIG. 5, if processing module P1 wants to send data to P4, P1 writes data into DEB B1 thorough the routing module R1 and node P4 reads the data from B1 through RM R4. On the other hand, if P1 wants to send data to P3, then P1 writes the data into DEB B1 through R1, routing module R4 reads the data from B1 and writes the same into DEB B2. P3 will then read the data from B2 through R3. Similarly, data can be routed from any processing module to any other processing module through multiple DEBs and RMs.

FIG. 6 illustrates another connection topology where multiple types of connections are used. The different types of connections that are shown in the multiprocessor system 150 are connection 110, which is a connection between RM and DEB, connection 112, which is a connection between PM and DEB, connection 114, which is a connection between PM and RM, and connection 116, which is connection between RM and another RM. These multiple types of connections enable flexible yet efficient multiprocessor communication mechanism suitable for parallel execution and parallel data exchange.

It should be noted that in one embodiment of the present technique, the one or more routing modules are adapted to route the data through a pre-determined path to the at least one of a processing module or one or more buffer modules or both. In another embodiment of the present technique, the one or more buffer modules temporarily store data prior to the exchange of data in the multiprocessor computer system.

DEB 108 is a unidirectional data transfer and temporary storage element with a source (input) interface and a drain (output) interface. The module that writes data into DEB through the source interface is called as the source module. The module that reads data through the drain interface is called as the drain module. Source and drain modules work as master modules who initiate write or read operations and DEB works as a slave device who responds to these write and read operations. Either the processing modules (PM) 104 or routing modules (RM) 106 can be used as source or drain modules. Processing module can be any microprocessor or any specific hardware module which can suitably interface with DEB 108. An embodiment of Routing module 106 is disclosed in the later paragraphs. The DEB 108 can be operated in two modes; ping-pong mode and FIFO mode. The ping-pong mode of operation is used for sending packets of data. While one packet is being drained out another packet can be written into DEB without any delay. The FIFO mode of operation is used when a continuous stream of data needs to be transferred.

Figure 7:
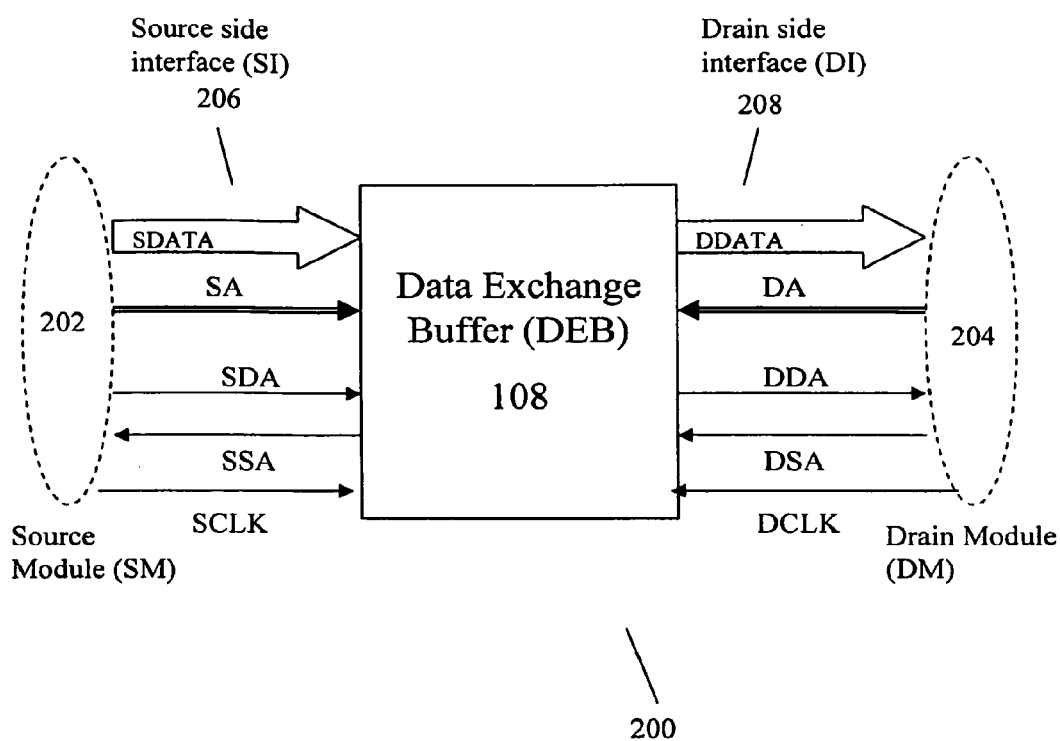
FIG. 7 is a block diagram depicting interface signals of a Data Exchange Buffer (DEB), in one embodiment of the present technique.

FIG. 7 is a block diagram of a system 200, depicting interface signals of data exchange buffer (DEB) module 108. Source interface (SI) 206 is the interface through which data is written into DEB 108. Drain interface (DI) 208 is the interface through which data is read out of the DEB 108. SI 206 comprises data bus SDATA which is an input data bus for DEB 108. Width of the data bus SDATA can be determined based on the width of the system data bus or processor data bus as the case may be. SI 206 also comprises an address bus SA of predetermined width based on the number of registers to be addressed within the DEB. These address lines are driven by the module 202 (PM or RM) connected on the source side of the DEB. In the exemplary embodiment shown here, SA has two bits SA1 and SA0 using which one can address 3 registers and one data buffer inside the DEB. SI 206 also comprises two hand shake signals and a clock signal. The handshake signals are SDA (Source side Data Available) and SSA (Source side Space Available). The clock signal is SCLK (Source Clock) which is of the same frequency as that of the module 202 (PM or RM) connected on the source side of the DEB. The handshake signal SDA is kept active by the source side module whenever it is ready to send data. The handshake signal SSA is kept active by the DEB whenever it has space inside the DEB to receive data from source side interface. SDATA is written into the DEB at the clock edge of SCLK when both SDA and SSA are active.

DI 208 comprises data bus DDATA which is an output data bus for DEB 108. Width of the data bus DDATA can be determined based on the width of the system data bus or processor data bus as the case may be. DI 208 also comprises an address bus DA of predetermined width based on the number of registers to be addressed within the DEB. These address lines are driven by the module 204 (PM or RM) connected on the drain side of the DEB. In the exemplary embodiment shown here, DA has two bits DA1 and DA0 using which one can address 3 registers and one data buffer inside the DEB. DI 208 also comprises two hand shake signals and a clock signal. The handshake signals are DDA (Drain side Data Available) and DSA (Drain side Space Available). The clock signal is DCLK (Drain Clock) which is of the same frequency as that of the module 204 (PM or RM) connected on the drain side of the DEB. The handshake signal DDA is kept active by the DEB whenever it has data in it and is available for reading. The handshake signal DSA is kept active by the module 204 (PM or RM) connected on the drain side of the DEB whenever it is reading the data from the drain side interface of DEB. DEB outputs the next data on DDATA lines at the clock edge of DCLK when both DDA and DSA are active.

In one embodiment of the present technique, an exemplary implementation of DEB 108 as shown subsequently in FIG. 8 and FIG. 9, comprises three types of registers. They are configuration register, path selection word register and source node & size info register. Configuration register 306 is used for configuring the modes and any other configuration parameters of the DEB. Path selection word is used for specifying the path to be traversed by the data to reach the destination module (in the context of RM). Source node & size info register is used for sending the source node identification number and size info related to the data transfer. Mode (ping-pong or FIFO) of operation is selected by writing appropriate values into the configuration register 306 of the DEB.

Figure 8:
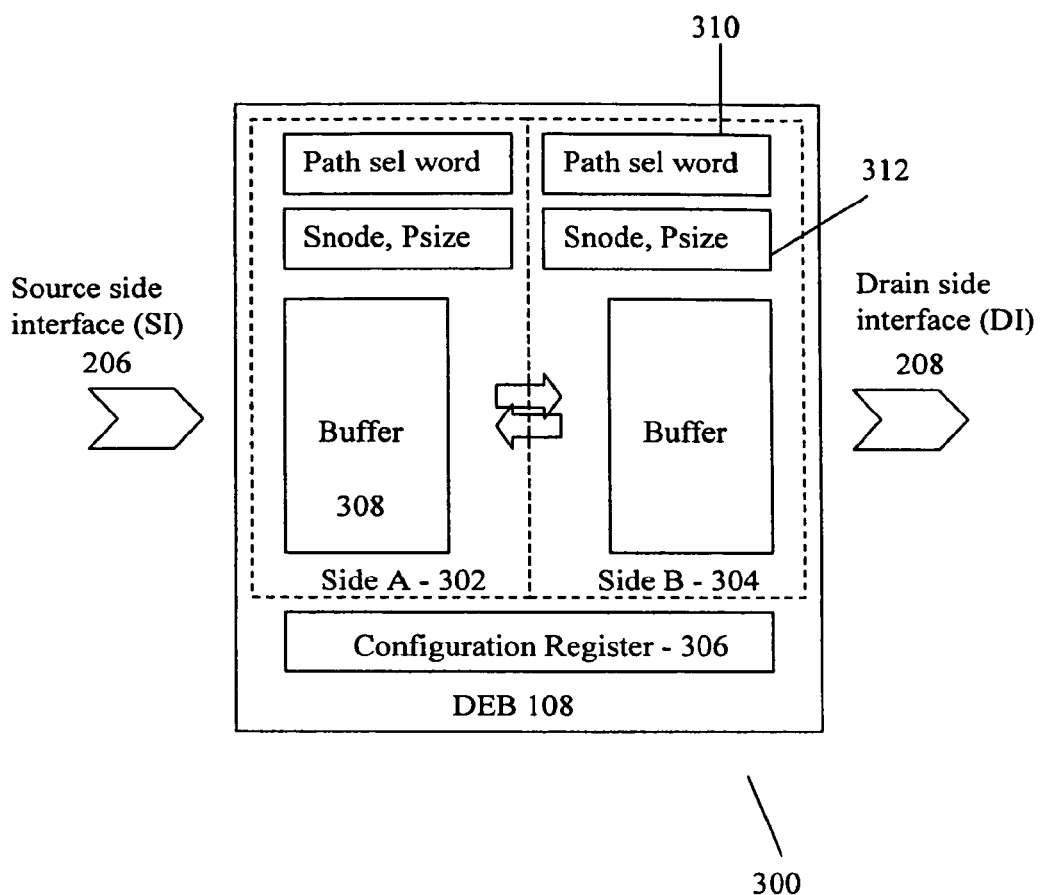
FIG. 8 is a block diagram illustrating the function of Data Exchange Buffer in Ping-pong mode of operation, in one embodiment of the present technique.

FIG. 8 is a block diagram of a system 300 illustrating an embodiment of DEB 108 in ping-pong mode of operation. In this mode, DEB 108 comprises one configuration register and two sets of identical resources called as Side A 302 and Side B 304. Each side comprises one path selection word register, one source node & size info register and one memory buffer of predetermined size. Once the source module 202 configures the DEB to operate in ping-pong mode by writing an appropriate value into the configuration register 306, it uses SI 206 to write into Side A 302 of the DEB. This is done by first writing the path selection word 310, source node & size register 312 and then continuously writing the data into the buffer 302. Details of the path selection word 310 will be discussed later in the context of routing module. The register 312 will contain Snode and Psize information. Snode gives the source identification number from where the data has originated and Psize specifies the size of the data packet to be written into the memory buffer. When the number of data items written into the memory buffer 308 reaches Psize, the side is said to be filled. Once the Side A 302 is filled, the resource of the side A 302 and side B 304 are swapped so that side A 302 is now available for the DI to be read out and side B 304 is available for SI to fill in. Filling in of side B 304 by SI and reading out of side A 302 through DI now can happen simultaneously. This swapping of side A 302 and side B 304 and the vice versa between SI 206 and DI 208 will happen continuously till all the data is transferred.

Figure 9:
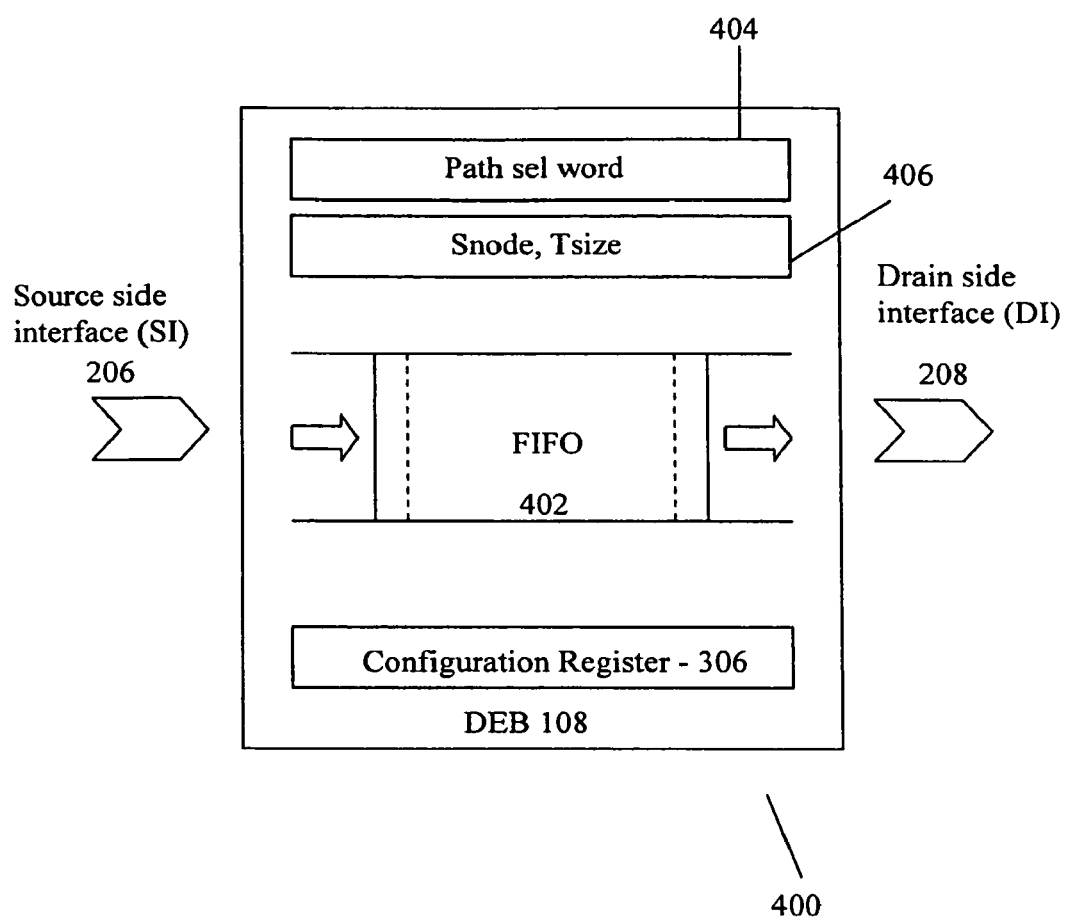
FIG. 9 is a block diagram illustrating the function of Data Exchange Buffer in First-in-First-out mode of operation, in one embodiment of the present technique.

FIG. 9 is a block diagram of a system 400 illustrating an embodiment of DEB 108 in FIFO mode of operation. In this mode DEB 108 comprises one single FIFO memory 402 made by combining two buffers 308 shown in ping-pong mode of operation. Also, only one set of registers are used in this mode. The source module 202 configures the DEB to operate in FIFO mode by writing an appropriate value into the configuration register 306. The writing operation starts by first writing the path selection word 404, source node & size register 406 and then continuously writing the data into the FIFO 402. Details of the path selection word 404 will be discussed later in the context of routing module. The register 406 will contain Snode and Tsize information. Snode gives the source identification number from where the data has originated and Tsize specifies the high water mark and low water mark for the FIFO. When the number of data items written into the FIFO reaches high water mark, the data will be made available for the drain side 208 for reading. The module connected to the DI can read out the data till the number of items in the FIFO reaches the low water mark.

In ping-pong mode of operation DEB makes DDA signal on DI side active only when one full packet of data is available for reading. Whereas, in FIFO mode of operation DEB makes DDA active when number of data items exceeds the high water mark threshold set for the FIFO. Similarly, in ping-pong mode of operation DEB makes SSA signal on SI side active only when one full buffer is empty. Whereas, in FIFO mode of operation DEB makes SSA active when at least one data item space is available for writing.

Figure 10:
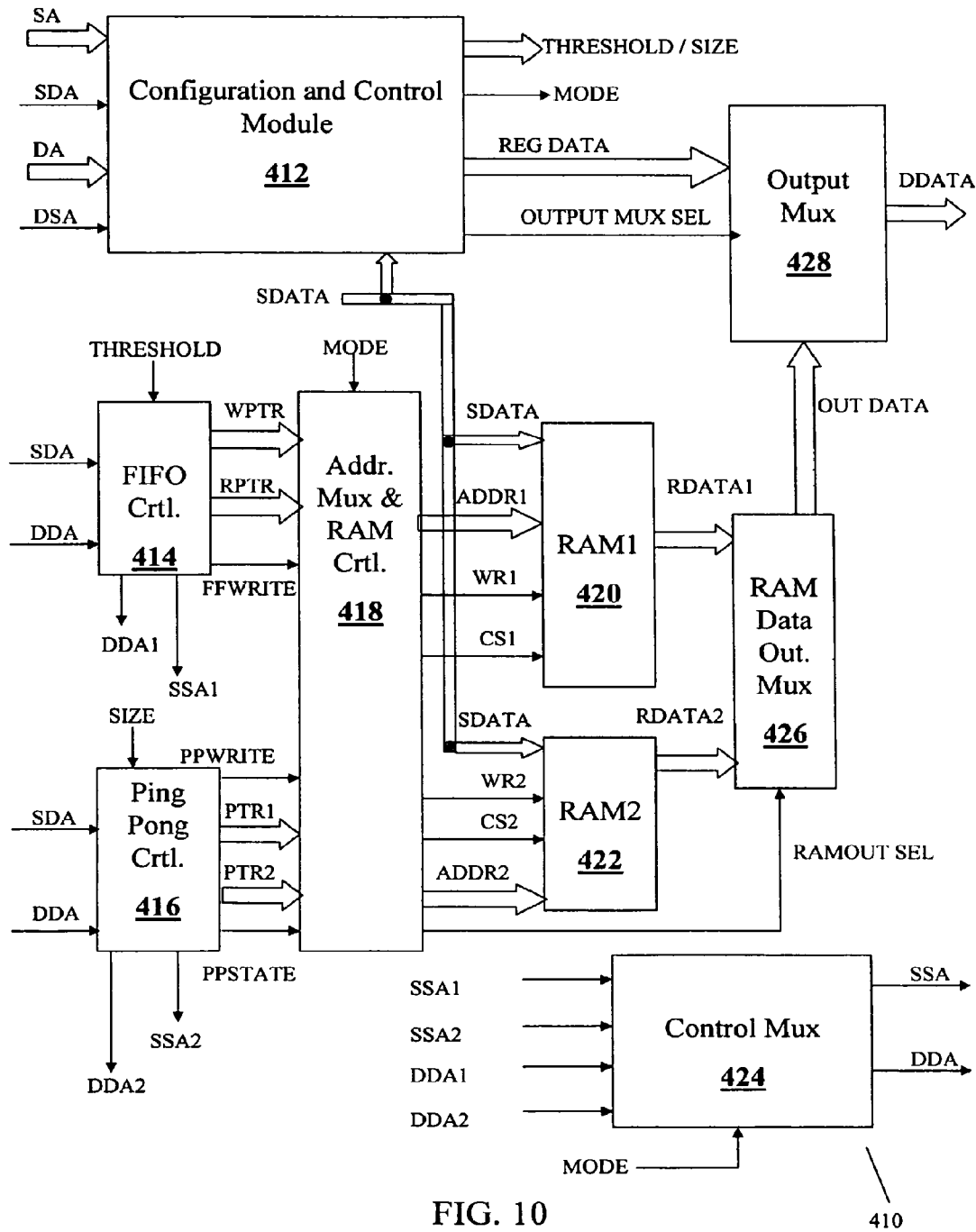
FIG. 10 depicts system block diagrams of exemplary embodiment of a Data Exchange Buffer (DEB), in one embodiment of the present technique.

FIG. 10 depicts block diagram of a system 410 depicting a data exchange buffer (DEB), in one embodiment of the present technique. In the present embodiment, DEB 108 consists of Configuration and Control module 412, FIFO control module 414, Ping Pong Control module 416, Address Mux and RAM control module 418, RAM 1 420, RAM2 422, Control Mux 424, RAM DataOut Mux 426 and Output Mux 428. The Configuration and Control module 412 allows source interface to write into configuration register, size/threshold register and path register. It also facilitates Drain Interface (208) to read these registers via the REG DATA signal. The Configuration and Control module determines the mode of operation of the DEB (FIFO or Ping Pong). The THRESHOLD signal contains information about the high water mark and low water mark of the FIFO. The SIZE signal contains information about the packet size in the Ping Pong mode of operation. This module controls the Output Mux via OUTPUT MUX SEL signal generated by decoding SA and DA addresses. The FIFO Control module handles the source 206 and drain 208 handshaking in FIFO mode. This modules generates WPTR, RPTR and FFWRITE signal for the FIFO. The WPTR signal points to a location in FIFO where the next data is to be written. The RPTR signal points to a location in FIFO where the next data is to be read from. FFWRITE signal indicates weather a write or read operation is currently being performed on the FIFO. The WPTR and RPTR signals are initialized to the start of the FIFO. Every write operation results in incrementing the WPTR. When WPTR reaches high water mark in the THRESHOLD signal, DDA1 signal is made active indicating that data is available to be read by the Drain Interface 208. Every read operation results in incrementing the RPTR. When RPTR reaches low water mark in the THRESHOLD signal, DDA1 signal will be made inactive indicating that there is no data available to be read by the Drain Interface 208. The handshake signal SSA1 is kept active as long as WPRT has not reached the maximum size of the FIFO. The Ping Pong control module handles the source 206 and drain 208 handshaking in the Ping Pong Mode of operation of the DEB. It generates signals PTR1 and PTR2 for reading/writing from RAM1/RAM2. In the Ping Pong mode of operation, if RAM1 is in write mode then RAM2 would be in read mode and visa versa. This is indicated by the signal PPSTATE generated by the Ping Pong control module. The signal PPWRITE is a control signal to indicate the timing of write operation into the RAM1/RAM2. The Address Mux and RAM Control module drives the addresses and control lines for the RAMs suitably based on the mode of operation of the DEB. It arranges the RAM1 and RAM2 as the two buffers 308 in ping pong mode. It combines RAM1 and RAM2 into a single FIFO 402 in FIFO mode of operation. The RAMOUT SEL signal is generated by this module to indicate to the RAM Data Out Mux as to which RAM to select during a read operation. In the ping pong mode, RAMOUT SEL signal depends on the PPSTATE signal. In the FIFO mode, RAMOUT SEL signal depends on the RPTR signal. If RPTR points to an address in RAM1, RAMOUT SEL signal would indicate that RAM1 needs to be selected. If RPTR points to an address in RAM2, RAMOUT SEL would indicate that RAM2 needs to be selected. RAM1 and RAM2 are memory modules within the DEB that store data. The RAM Data Out Mux multiplexes the output of the RAMs into the OUTDATA signal. The Output Mux multiplexes the OUTDATA signal from the RAM Data Out Mux. and REG DATA signal from Configuration and Control Module into DDATA signal. The DDATA signal is the output of the DEB. The Control Mux multiplexes handshake signals generated by the FIFO control module and Ping Pong Control module into output handshake signals SSA and DDA. The mode signal generated by the Configuration and Control module is used as the mux selection signal.

Figures 11, 12:
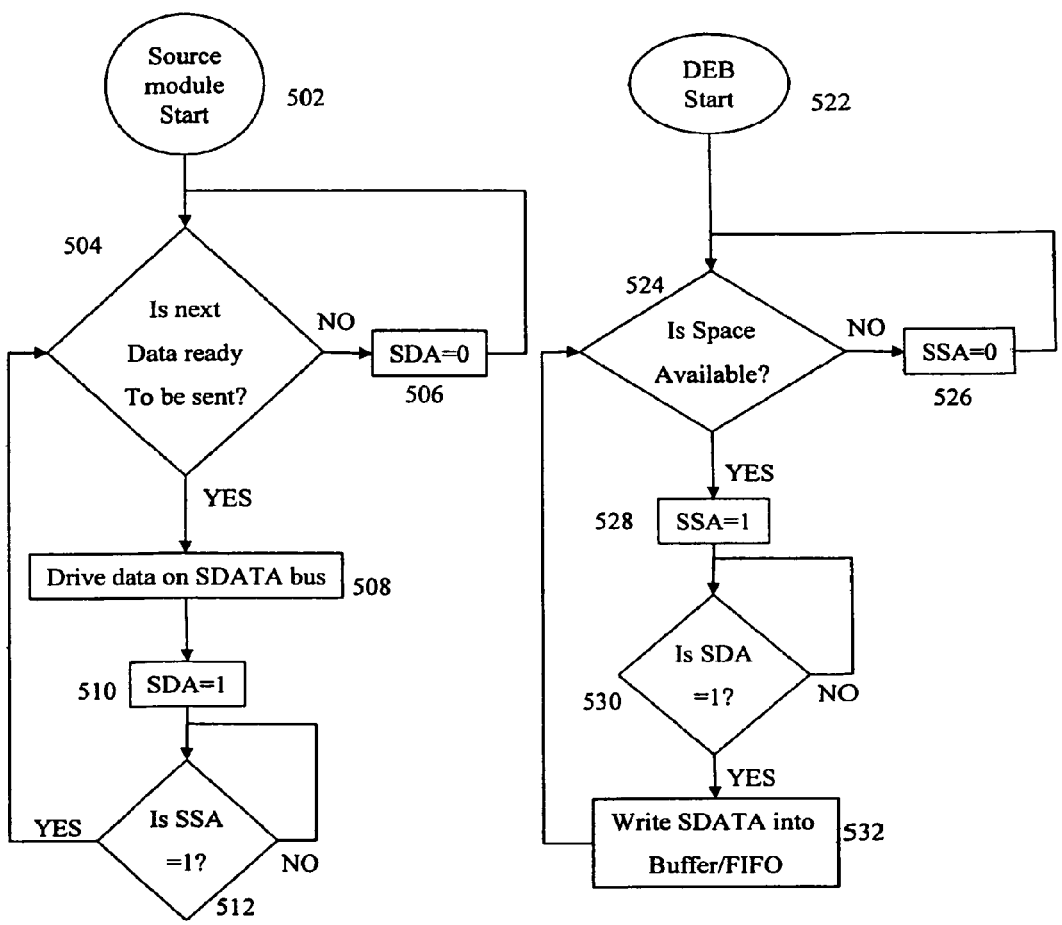
FIG. 11 illustrates a method of handshaking performed by a source node for writing data into a DEB connected to its output, in one embodiment of the present technique.
FIG. 12 illustrates a method of handshaking performed by a DEB for receiving data from the source node connected to its input, in one embodiment of the present technique.

FIG. 11 and FIG. 12 are flow diagrams, illustrating various methods of handshaking mechanism used while writing into the DEB 108, in an embodiment of the present technique. The control flow within the source module 202 is shown in FIG. 11 and control flow within the DEB is shown in FIG. 12. The control flow is same for both ping-pong mode and FIFO mode. Only the signals DDA and SSA are driven differently as mentioned in the above paragraph. At step 504 source module checks to see whether it has any data ready to be sent. If yes, it drives the data on SDATA bus at step 508 and makes SDA active at step 510. If no, it makes SDA inactive at step 506 and goes back to step 504. At the same time, DEB at step 524 checks to see if space is available to receive next data (one data item space in FIFO mode, one full buffer space in ping-pong mode). If yes, DEB drives SSA active at step 528. If no, DEB makes SSA inactive at step 526 and goes back to step 524. At step 530, while SSA is active, DEB checks to see if SDA (received from source module) is also active. If yes, at step 532 SDATA gets written into internal memory (buffer 308 in ping-pong mode or FIFO 402 in FIFO mode of operation). If no, DEB waits in step 530 till SDA goes active. After step 532, DEB returns to step 524 to check space availability. At the same time, after step 510, source module, checks to see if SSA received from DEB is active at step 512. If yes, source module goes back to step 504 to see if next data is available for sending.

Figures 13, 14:
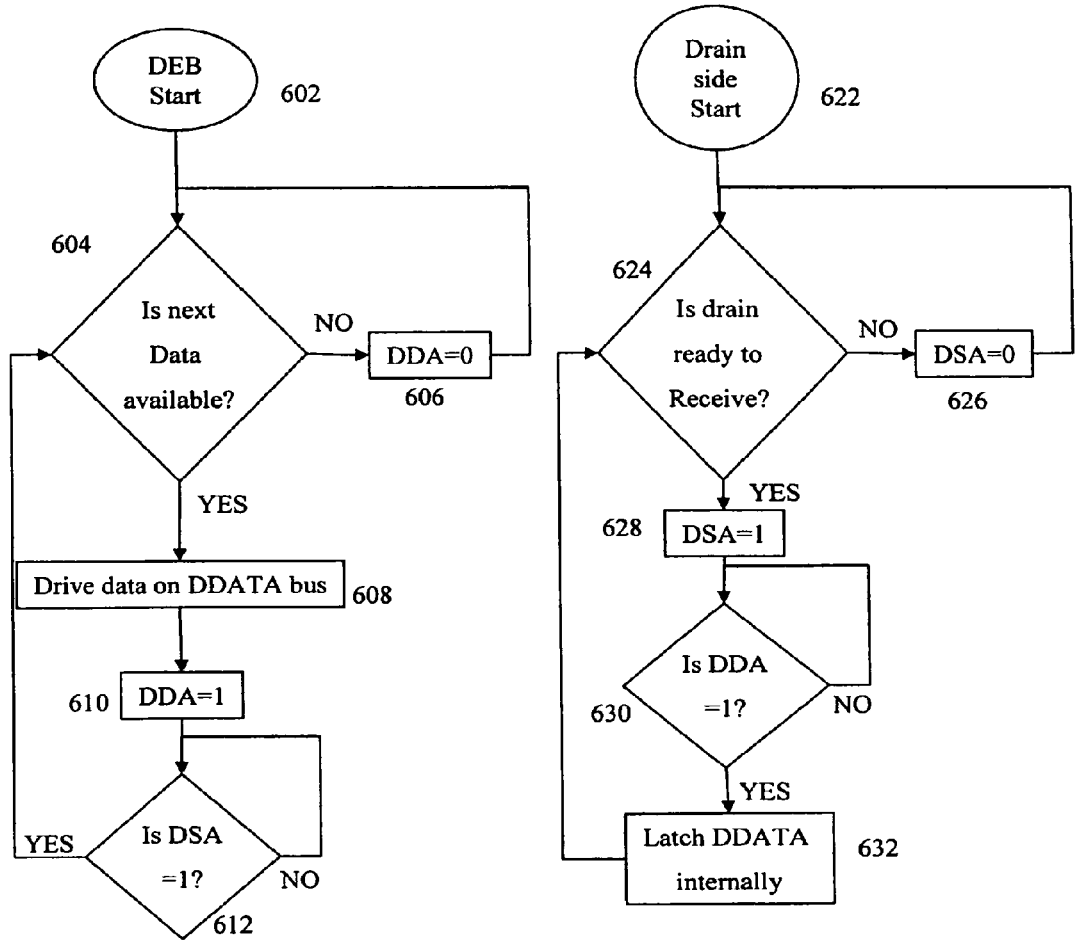
FIG. 13 illustrates a method of handshaking performed by a DEB for delivering the data to the drain node connected to its output, in one embodiment of the present technique.
FIG. 14 illustrates a method of handshaking performed by a drain node for reading the data from a DEB connected to its input, in one embodiment of the present technique.

FIG. 13 and FIG. 14 are flowcharts illustrating various methods of handshaking mechanism used while reading from the DEB 108, in an embodiment of the present technique. The control flow within the drain module 204 is shown in FIG. 14 and control flow within the DEB is shown in FIG. 13. The control flow is same for both ping-pong mode and FIFO mode. Only the signals DDA and SSA are driven differently. At step 604 DEB checks to see whether it has any data ready to be sent (exceeding high water mark in the case of FIFO mode, availability of one full packet in the case of ping-pong mode). If yes, it drives the data on DDATA bus at step 608 and makes DDA active at step 610. If no, it makes DDA inactive at step 606 and goes back to step 604. At the same time, drain module at step 624 checks to see if it is ready to receive next data (one data item in FIFO mode, one full buffer in ping-pong mode). If yes, drain module drives DSA active at step 628. If no, drain module makes DSA inactive at step 626 and goes back to step 624. At step 630, while DSA is active, drain module checks to see if DDA (received from DEB) is also active. If yes, at step 632 drain module latches the DDATA internally. If no, drain module waits in step 630 till DDA goes active. After step 632, drain module returns to step 624 to check to see if it is ready to receive next data. At the same time, after step 610, DEB, checks to see if DSA as received from drain module is active at step 612. If yes, DEB goes back to step 604 to see if next data is available for reading.

Figure 15:
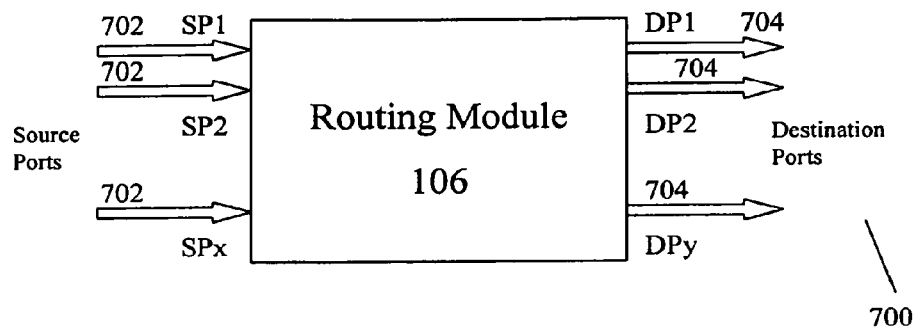
FIG. 15 and FIG. 16 depict Routing Module interface signals, in one embodiment of the present technique.

FIG. 15 is a block diagram of a system 700, depicting interfaces of a router module (RM) 106, in an embodiment of the present technique. RM 106 comprises one or more source ports SP1, SP2 etc., till SPx (where 'x' is the number of source ports) and one or more destination ports DP1, DP2 etc., till DPy (where 'y' is the number of destination ports). Data enters the routing module from source ports and leaves the routing module through destination ports. RM 106 can route the data from any source port (SP) 702 to any destination port (DP) 704. The routing module RM 106 determines the appropriate destination port needed to route the data by reading the path information from the source port. In an embedded multiprocessor system where each processing module would perform a predetermined function, the data paths for communicating from one processing module to another can be predetermined. Hence, it is possible for the source processing module to specify the complete path the data should take to reach the final destination processing module before writing the data packet or stream into its output DEB. Every routing module RM 106 encountered by the data packet on its path to the final destination processing module uses and transmits the path information to the next stage along with the data. Thus the DEB mode (ping-pong or FIFO mode), source node identification and size (packet size in ping-pong mode, high/low water mark in FIFO mode) are preserved through out the path of the data.

If multiple processing modules send data through a shared path at different times, the DEBs in the shared path are automatically configured into the different modes of operation temporarily during the data transfer. The routing module is agnostic to the operating modes of DEBs connected to its source ports and destination ports. If the DEB connected to a source port is configured to be in ping-pong mode for a given data transfer operation, then the routing module routes fixed size data packets for that data transfer operation. This can be called as 'packet routing'. On the other hand if the DEB connected to a source port is configured to be in the FIFO mode, the routing module maintains the connection as long as the DEB connected to the source module is giving the data. This can be called as 'stream switching'. If the DEB is configured in FIFO mode with a non-zero high water mark value and zero low water mark value, then the stream switching for such a source port and packet routing for another source port (with ping-pong configured DEB) can be made to happen on a shared path without corrupting the data. Hence, the routing module 106 dynamically provides both 'stream switching' and 'packet routing' features without having to be specifically configured for such modes. This flexibility provided by the routing module makes the data flow very natural by eliminating the need of an elaborate data routing or connection setup overhead and hence improves the overall efficiency of the data exchange in an embedded multiprocessor system.

Figure 16:
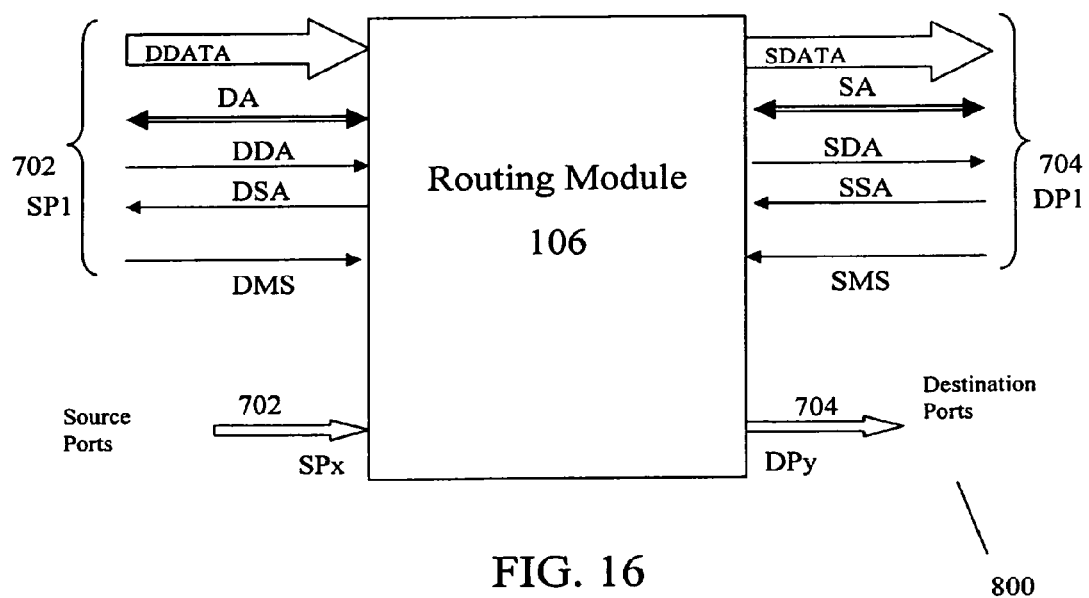

FIG. 16 is a block diagram of a system 800, depicting details of source port and destination port signals, in an embodiment of the present technique. Each source port SP comprises an input data bus DDATA, bidirectional address lines DA, handshake signals DDA and DSA in additional to an input signal DMS (master/slave). All these signals except the DMS signal are similar to that of DI 208 and can be connected directly to the DI 208. The DMS signal when active signifies that the port SP is connected to a master device. In such a case, DA lines will be driven by the master module connected to the source port. The master module can be another routing module 106 or a processing module 104. An inactive DMS line implies that the source port SP is connected to a slave device (DEB 108). In such a case RM 106 will drive the DA lines. Each destination port DP comprises an output data bus SDATA, bidirectional address lines SA, handshake signals SDA and SSA in additional to an input signal SMS (master/slave). All these signals except the SMS signal are similar to that of SI 206 and can be connected directly to the SI 206. The SMS signal when active signifies that the port DP is connected to a master device. In such a case, SA lines will be driven by the master module connected to the destination port. The master module can be another routing module 106 or a processing module 104. An inactive SMS line implies that the destination port DP is connected to a slave device (DEB 108). In such a case RM 106 will drive the SA lines.

Figure 17:
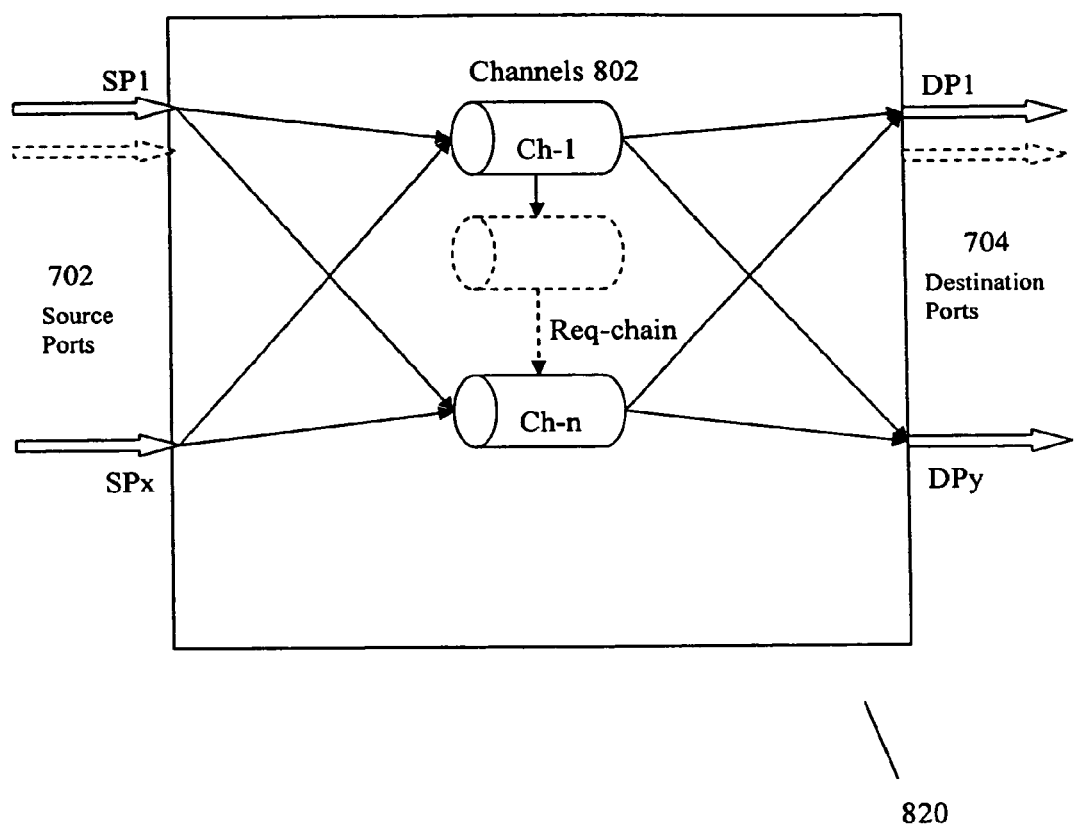
FIG. 17 depicts routing of data through channels inside the Routing Module, in one embodiment of the present technique.

FIG. 17 is a block diagram of a system 820, illustrating functioning of routing module 106 in routing of data from any source port 702 to any destination port 704, in an embodiment of the present technique. RM 106 comprises one or more logical channels 802. Each channel 802 can carry one connection from a source port 702 to a destination port 704. The exact number of channels to be supported for a given RM 106 is decided based on the number of parallel connections required within that routing module 106. The effective request line SPReq generated from the priority scheme (FIG. 20) for the source port requests is connected to all the channels Ch-1 to Ch-n. A signal Req-chain is used for daisy chaining the channels so that the first free channel will pick up the SPreq for servicing.

The routing module 106 reads path information from the source port and uses this information to make the connection to the appropriate destination port. In one embodiment of the present technique, the routing information is organized in the form as depicted in FIG. 19. The routing module reads information about the immediate next destination port and writes the remaining information into the module (e.g. DEB) connected to the destination port.

Figure 18:
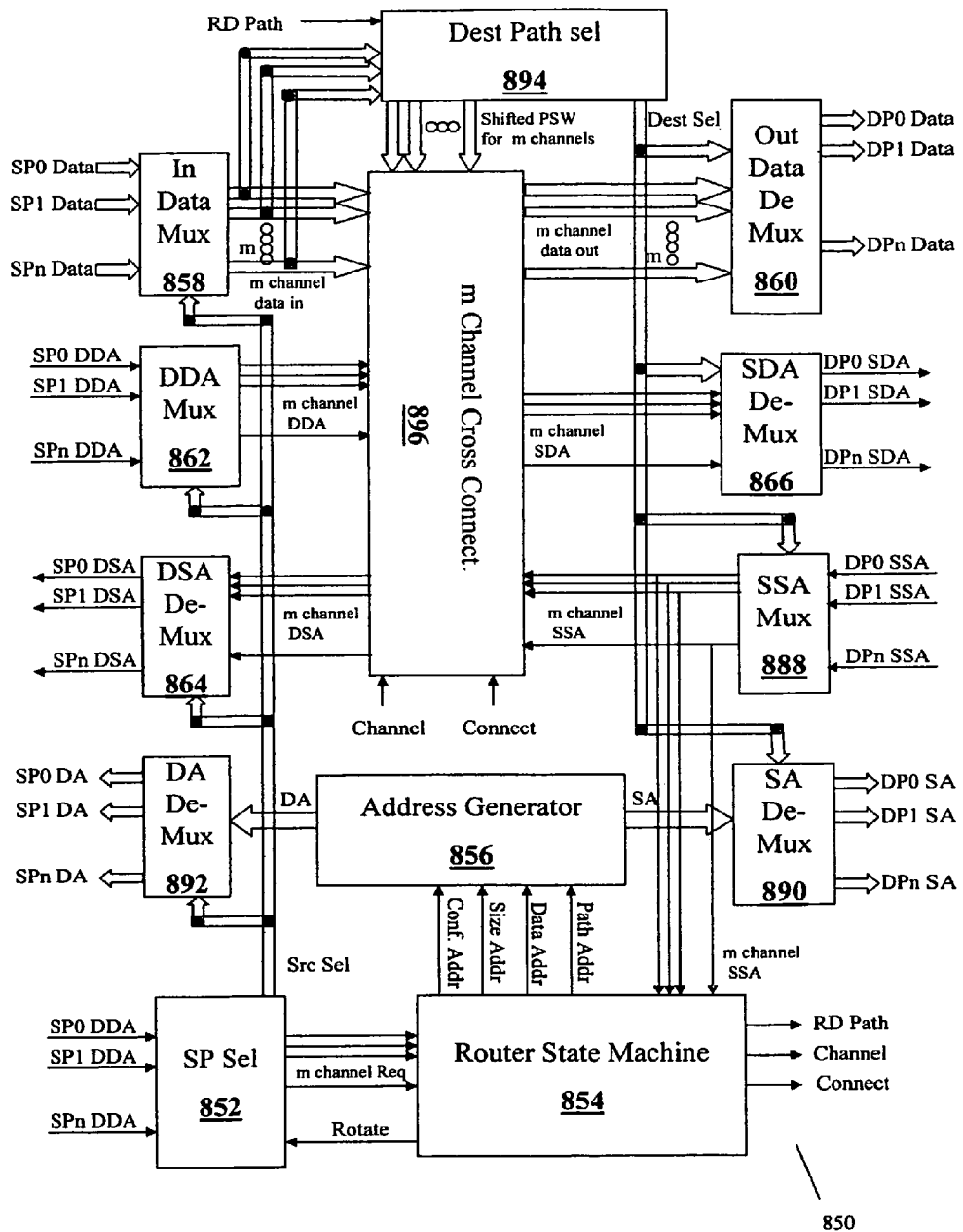
FIG. 18 a depicts system block diagrams of exemplary embodiment of a m channel Routing Module (RM) with n ports, in one embodiment of the present technique.

FIG. 18 depicts a block diagram of a system 850 illustrating 'm' channel Routing Module (RM) with 'n' ports, in an embodiment of the present technique. The routing module is shown to have 'n' source ports, 'n' destination ports and 'm' channels. The routing module consists of SP Sel module 852, Router State Machine module 854, Address Generation module 856, In Data Mux 858, Out Data DeMux 860, DDA Mux 862, DSA DeMux 864, SDA DeMux 866, SSA Mux 888, SA DeMux 890, DA DeMux 892, Dest. Path Sel module 894 and m Channel Cross Connect module 896. The SP Sel module in one embodiment, implements a rotating priority scheme to select utmost 'm' requests among the 'n' source ports which are ready to transmit data. The SP Sel module has at its disposal 'm' channels that it can allocate to the requesting source ports. The Req signal for the corresponding channel is made active to request the use of the channel to service the source port. Simultaneously the source port number is also placed on the Src Sel signal. In the present embodiment the Rotate signal will cause the SP Sel module to rotate the assignment of priority among the source ports. A priority scheme is explained in detail in later sections. The Router State Machine module implements the sequence of operations involved in the routing of data from the source ports to the destination ports by issuing control signals to various other modules. On receiving a request (m channel Req), the Router State Machine module will make the Path Addr and RD Path signals active and wait for response via the m channel SSA signal. This signal indicates that availability of the destination port. If the response indicates that the destination port is not available, the Router State Machine module will request the SP Sel module to pick the next request in priority via the Rotate signal. If the destination port is available, the Router State Machine module will make the Size Addr. And Conf.Addr signals active one after the other. This will cause the Address Generator module to read the size and configuration information from the source port and write the same into the destination port. Next it will activate the Data Addr signal, place the channel number on the Channel signal and issue the connect command. Once data has been transferred from the source port to the destination port, the corresponding request channel will become inactive and this will cause the Router State Machine module to issue a disconnect request on the Connect line. Now the channel becomes available to service other requests.

The Router State Module 854 can service m requests at a time. The Address Generator module 856 generates address for path selection word register, size register, configuration register and data on SA and DA signals. The In Data Mux is a 'n' to 'm' multiplexer. It multiplexes source port data from 'n' ports into m channel data in signal based on the Src Sel signal. The Out Data DeMux is a 'm' to 'n' demultiplexer. It demultiplexes m channel data out signal on to 'n' destination data ports based on the Dest Sel signal. The DDA Mux and SSA Mux are 'n' to 'm' signal multiplexer. The DSA DeMux and SDA DeMux are 'm' to 'n' signal demultiplexer. The DA DeMux and SA DeMux are 'm' to 'n' address demultiplexers.

The Dest Path Sel module selects the destination port based on the path selection word (PSW) read from the source port. When RD Path signal is active, the Dest Path Sel module reads m channel data in signals to obtain the path selection word (PSW). It extracts the destination path from the PSW and places it on the Dest Sel signal. It also shifts out the destination path information from the PSW and places the updated information on the Shifted PSW for m channels signal. The m channel cross connect module connects the data and handshake signals of the selected source port and selected destination port for a given channel. It can support m simultaneous connections. When the connect signal becomes active, the module will read the channel signal and make appropriate connections for the corresponding channel.

FIG. 19 is a block diagram of a system 897, illustrating contents of path selection word used in routing of data within the routing module, in one embodiment of the present technique. As illustrated, the system comprises a set of destination port selectors (DPSel values) which determine the path the data takes while traversing through multiple routing modules. At the first routing module, DPsel0 is used to select the destination port. The first RM 106 shifts out (right shift) the DPSel0 from the PSW and writes the resulting path selection word into the module (e.g. DEB) connected to the destination port (selected based on DPSel0 value). The second RM 106 reads the PSW from the DEB connected to its source port and selects the destination port based on DPSel1 value. This second RM 106 shifts out the DPSel1 from the PSW and writes the resultant PSW into the module (e.g. another DEB) connected to the selected destination port. Similarly, DPSel2, DPSel3 etc. . . . , are used by successive routing modules till the data reaches the destination processing module 104. The number of bits required to store one DPSel value is based on the maximum number of destination ports provided in any routing module in a given multiprocessor system. The total number of DPSel values in one PSW is determined by the maximum number of hops the data takes to reach its final destination processing module 104 in a given multiprocessor system. If N=maximum destination ports supported on any routing module, W=maximum width of the path selection word and, H=maximum number of hops supported by the system; Then, $$H = \text{Truncate}\left(\frac{W}{\text{roundup}(\log_2 N)}\right)$$

Figure 20:
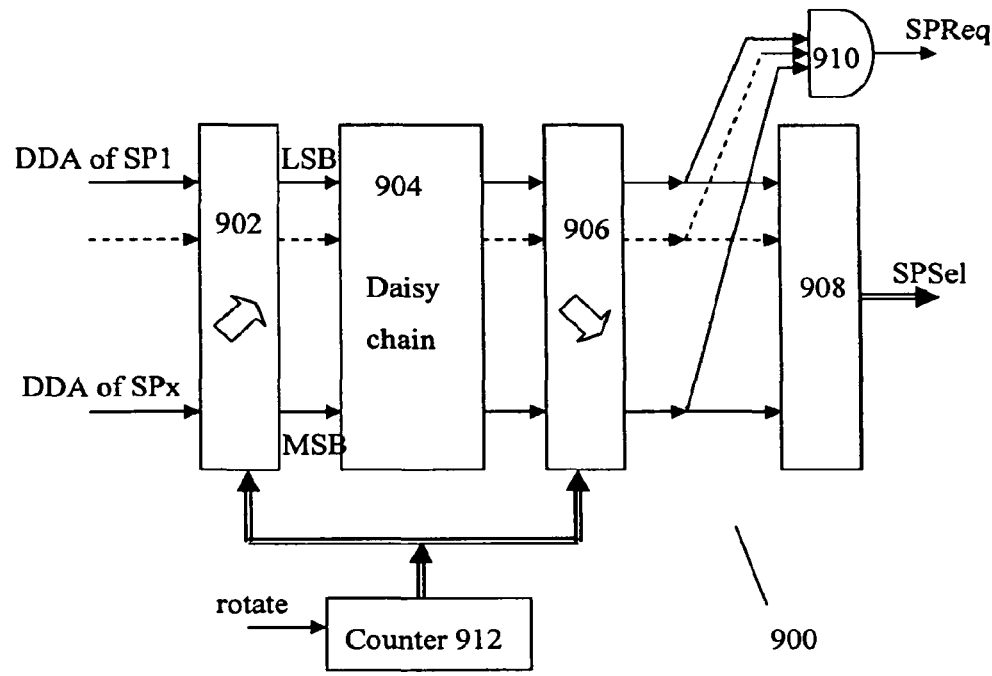
FIG. 20 illustrates the rotating priority scheme within the Routing Module, in one embodiment of the present technique.

FIG. 20 is a block diagram of a system 900, illustrating a simple and fast priority scheme that may be employed to prioritize source port requests if multiple requests are received simultaneously, in one embodiment of the present technique. Whenever data is ready, the module (DEB or equivalent) that is connected to a source port drives DDA signal active. DDA signals of all the source ports (SP1 to SPx where 'x' is the number of source ports) are connected to a shifter module 902. Output of the shifter 902 is a right shifted version of the input. Number of bits by which it is shifted is equal to the count produced by the counter 912. Output of the shifter 902 is given as the input to a daisy chain priority handler module 904. Lesser significant bits are arranged to be having higher priority than the more significant bits. If multiple signals at the input of 904 are active, it selects only least significant one of those and outputs only that signal as active. Hence, only one bit is active at the output of 904 when multiple bits are active at its input. Output bits of module 904 are connected to the input of a reverse shifter 906. The reverse shifter 906 performs exactly same number of shifts as that of the module 902 but in the opposite direction. Thus positions of the DDA requests of the source ports are maintained at the output of the module 906. If all the bits at the output of 906 are inactive, then it signifies that there was no request from any source port. This information is generated by the multi-input gate 910 which produces one output signal SPReq. When SPReq is active, this means, DDA request of at least one source port is active. Outputs of reverse shifter 906 are passed through an encoder 908 to produce SPSel signal. If total number of source ports is 'x' then SPSel will have $\log_2(x)$ number of bits. The counter 912 is used to change the priority of the DDA requests of the source ports. Initially, counter 912 outputs a value 'zero' and hence shifter module 902 does not introduce any shift. This means SP1 to SPx are passed without shift to the input of the daisy chain priority handler 904. SP1 will have the highest priority, SP2 will have the next highest priority and so on and SPx will have the least priority. When the routing module 106 determines the path required for the requested SP of the highest priority, it checks to see whether the corresponding destination port is free and ready. If it is not ready, then it sends a pulse on the 'rotate' line to the counter 912. Counter 912 increments by one and the shifter 902 shifts by one to the right. Now, SP2 will be given highest priority, SP3 next highest priority and SP1 will get the lowest priority. The 'rotate' signal will be pulsed as long as the requested destination port is not available, thus each time priority is rotated till destination port is available for some source port request. The counter 912 will also have $\log_2(x)$ number of bits. This rotating priority scheme is a simple to implement and a fair priority scheme where every source port gets equal chance and would avoid deadlock.

Figure 21:
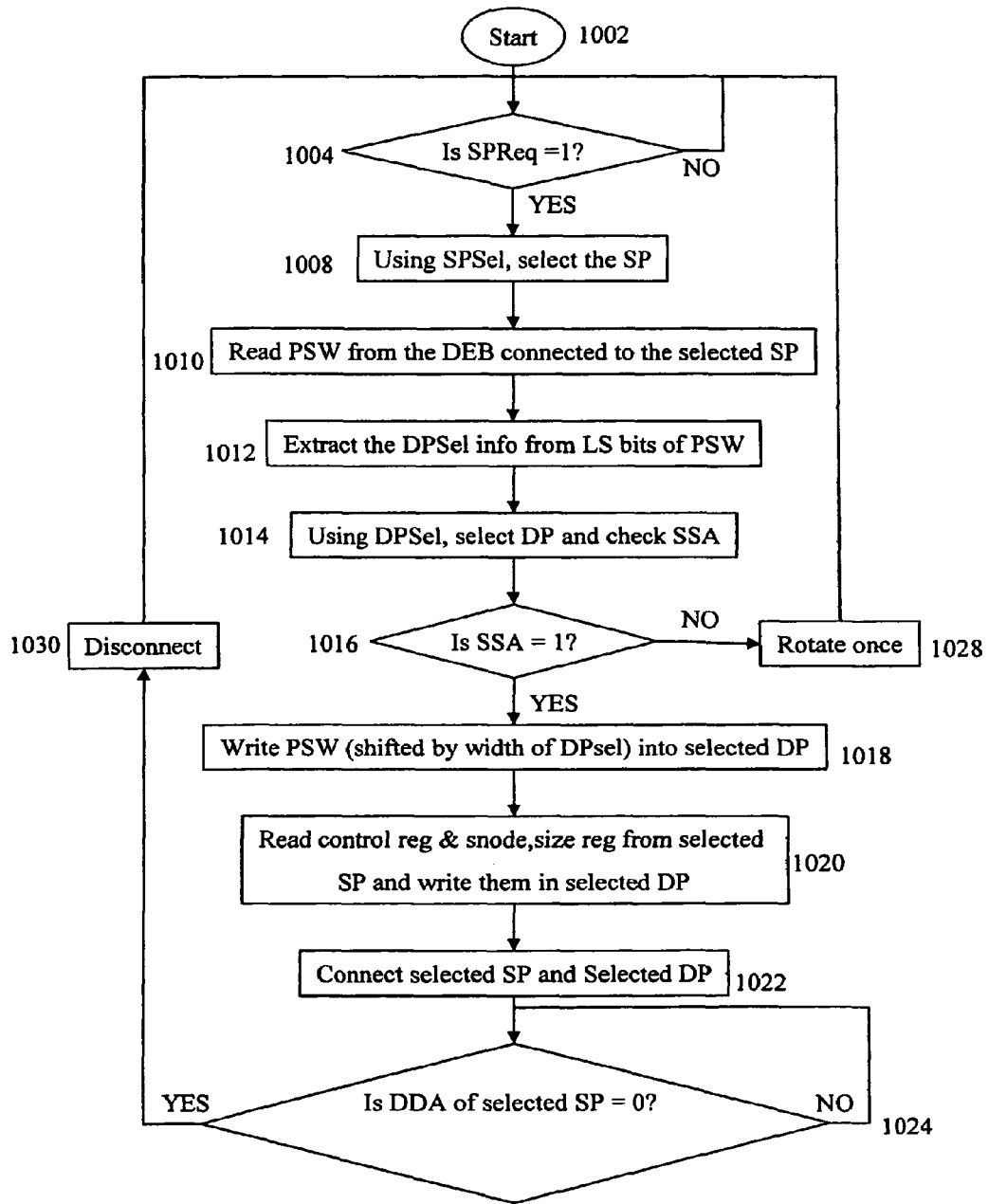
FIG. 21 illustrates a method of routing data by the Routing Module, in one embodiment of the present technique.

FIG. 21 is a flow diagram of a method depicting flow of routing data by the routing module, in one embodiment of the present technique. The method illustrates the flow chart for a channel state machine for routing/switching data in the routing module. At step 1004, the first free channel in the daisy chain checks for the SPReq signal (as shown in FIG. 20) is active. If no, the channel continuous to check for this signal. If yes, at step 1008, channel selects source port using SPSel value generated by the rotating priority scheme shown in FIG. 20. At step 1010, the channel reads path selection word (PSW) from the DEB (or any other equivalent module) connected to the selected source port. At step 1012, DPSel (as shown in FIG. 20) value is extracted from the predetermined number of least significant bits of the PSW. At step 1114, using DPSel value, SSA of the selected DP is read to see if it is active. If no, then at step 1028 'rotate' pulse is sent once to the counter and it would go back to step 1004. If yes, at step 1018, the channel writes shifted version of PSW into the DEB connected to the destination port selected by the DPSel value. At step 1020, configuration register and source node & size register are read from the DEB (or equivalent) connected to the source port selected by the SPSel value and these values are written into a DEB (or equivalent) connected to the destination port selected by the DPSel value. At step 1022, the channel makes the connection between the source port selected by the SPSel value and the destination port selected by the DPSel value. Once the connection is made the data transfer will happen from the selected source port to the selected destination port automatically as long as the data and the space are available. The channel state machine checks for the DDA to become inactive at step 1024. If no, the connection is maintained. If yes, at step 1030, the connection between the selected source port and destination port is broken and the control goes back to step 1004. Thus, data packets/stream and other relevant information are transferred from any source port to the selected destination port.

The data exchange system disclosed in the present invention may be implemented in a variety of applications which require multiple homogeneous or heterogeneous processing engines. However, the benefits of such a data exchange system is more pronounced in data flow driven heterogeneous multiprocessor systems where each processing engine performs a specific function and sequencing and parallelization of operations are determined by the availability of data at the input of next stage of processing. Examples of areas in which the present invention may be implemented include multi-core video processing embedded applications, embedded multiprocessor gaming platforms, speech or image recognition systems etc., which have the need to be optimized for both speed and power.

All or a portion of the devices and subsystems of the exemplary embodiments of FIGS. 5-21 may be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 5-21 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 5-21, for driving the devices and subsystems of the exemplary embodiments of FIGS. 5-21, for enabling the devices and subsystems of the exemplary embodiments of FIGS. 5-21 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 5-21. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 5-21 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Nonvolatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for traversing a plurality of routing modules located between a source module and a destination module in a multiprocessor computer system, the method comprising:
    representing each of the plurality of routing modules located between the source module and the destination module, by at least one bit using a numbering scheme;
    representing a path between the source module and the destination module, wherein the represented path is a collection of the representations corresponding to each of the plurality of routing modules that data needs to traverse;
    serially traversing each routing module in the represented path up to the destination module;
    updating the represented path at each traversed routing module, wherein the updated represented path consists of a representation of the path remaining between the traversed routing module and the destination module, the updating comprising shifting out bits representing the routing modules already traversed; and
    copying the updated represented path to the subsequent routing module.

* * * * *